(12) United States Patent
Hill et al.

(10) Patent No.: US 6,334,171 B1
(45) Date of Patent: Dec. 25, 2001

(54) WRITE-COMBINING DEVICE FOR UNCACHEABLE STORES

(75) Inventors: Dave L. Hill, Cornelius; Douglas M. Carmean, Beaverton; Brent E. Lince, Hillsboro; Muntaquim F. Chowdhury, Portland, all of OR (US)

(73) Assignee: Intel Corporation, Santa Ana, CA (US)

( * ) Notice: Subject to any disclaimer, the term of this patent is extended or adjusted under 35 U.S.C. 154(b) by 0 days.

(21) Appl. No.: 09/292,323

(22) Filed: Apr. 15, 1999

(51) Int. Cl.[7] .................................................. G06F 12/08
(52) U.S. Cl. ............................ 711/138; 711/119; 711/123
(58) Field of Search .................................... 711/138, 117, 711/119, 201, 220; 710/52, 39

(56) References Cited

U.S. PATENT DOCUMENTS 5,561,780 * 10/1996 Glew et al. ........................... 711/126
5,630,075 * 5/1997 Joshi et al. ........................... 711/100
6,122,715 * 9/2000 Palanca et al. ....................... 711/154

* cited by examiner

Primary Examiner—Reba I. Elmore
Assistant Examiner—Jasmine Song

(57) ABSTRACT

A system for write-combining uncacheable stores includes a memory order buffer, which receives first and second stores, and a data cache address and control, which receives the first and second stores from the memory order buffer. One of the memory order buffer and the data cache address and control determines whether the first and second stores are uncacheable and whether the first and second stores are contiguous in memory. If those conditions are satisfied, the data cache address and control write-combines the first and second stores before committing them to memory. The system may also apply additional conditions to determine whether the stores should be write-combined, for example requiring a minimum size for each store.

25 Claims, 4 Drawing Sheets

WRITE-COMBINING DEVICE FOR UNCACHEABLE STORES

FIELD OF THE INVENTION

The present invention relates to the transfer of data to memory in a computer system, and in particular relates to the write-combining of uncacheable data.

BACKGROUND INFORMATION

In a computer system, a piece of data which is to be transferred from a processor to some form of memory may be referred to as a "store." A "store" (as the term is used herein) may generally include a piece of data or a block of data, address information, and an instruction to transfer the data in memory. In many situations stores are transferred, or "committed," to various caches, which may be included within the processor or otherwise associated with the processor. Certain stores, however, are not amenable to cache storage. Instead, these "uncacheable stores" ("UC stores") must be committed to system memory, such as dynamic random access memory ("DRAM"), other similar memory, or, if suitable, a more permanent storage medium such as a hard drive.

In known processors and systems, UC stores are committed in the form received. That is, stores are committed to memory in the form originally sent, or "executed," by the processor (i.e., in "programatic" order). Because of varying sizes of these stores, however, direct commission to system memory fails to take advantage of the full bandwidth of the bus between the processor and memory. As a result, backups may occur between the processor and memory.

Based on the foregoing, there is a need for a device which makes more efficient use of the bandwidth between the processor and memory, thereby minimizing backups and hardware requirements.

SUMMARY OF THE INVENTION

A write-combining device for write-combining uncacheable stores is provided, including a memory order buffer and a data cache address and control. The memory order buffer receives a first store and a second stores. The data cache address and control is coupled to the memory order buffer and has at least one storage buffer. The data address and control receives the first and second stores from the memory order buffer, the first and second stores being write-combined in the storage buffer if the first and second stores are uncacheable and contiguous in memory.

DETAILED DESCRIPTION

As noted above, the present invention relates to uncacheable ("UC") stores, and in particular to an apparatus and method for "write-combining" (grouping together) UC stores. In general, a write-combining device according to the invention includes, for example, a pair of buffers which, in combination, examine UC stores as they are executed by a processor and write-combine the stores if certain conditions are satisfied. The write-combining device may then commit the stores to system memory at predetermined times, or in response to certain events. By write-combining UC stores, a write-combining device according to the present invention achieves higher bandwidth through the bus connecting the processor to memory. At the same time, by requiring certain conditions to be satisfied before write-combining, a write-combining device according to the present invention simplifies the process of unpacking the stores, thereby minimizing hardware requirements at the back end.

It should be understood that the term "write-combining device" as used herein may comprise, for example, a processor; a group of processors; a component, subset or other part of a processor; or a component (or set of components) connected to or otherwise associated with a processor. Accordingly, the term "write-combining device" should be given this broad reading. In addition, while in one embodiment of a write-combining device according to the present invention certain elements perform certain functions, these functions may be performed by other elements in a different embodiment of a write-combining device according to the present invention. Finally, it should be understood that the term "UC store" may include any store being sent to system memory, and that the determination that a store is uncacheable may be made at any time before or during execution of the store.

Figure 1:
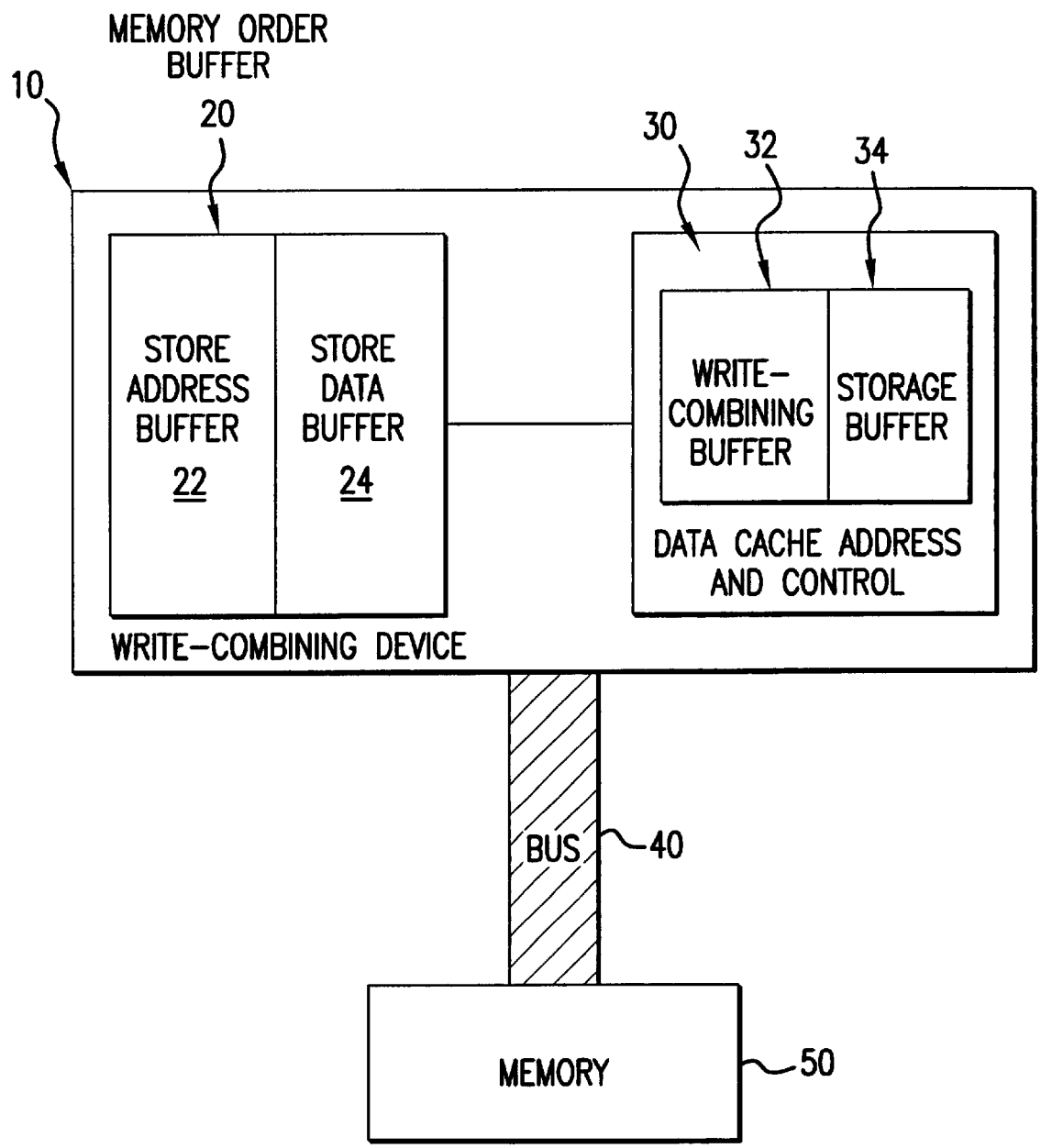
FIG. 1 is a schematic view of an exemplary embodiment of a device according to the present invention.

FIG. 1 shows an exemplary embodiment of a write-combining device 10 according to the present invention. As illustrated in FIG. 1, an embodiment of a write-combining device 10 includes a memory order buffer ("MOB") 20 and a data cache address and control ("DAC") 30, which together receive stores from a processor, combine the stores under certain conditions, and commit the stores to memory. MOB 20 may act as an initial gateway for the stores. In this respect, MOB 20 may receive UC stores as they are executed and check certain parameters, as described below. MOB 20 includes, for example, a pair of arrays: a store address buffer ("SAB") 22 and a store data buffer ("SDB") 24. The data to be transferred to memory may be stored in SDB 24, while the address information related to that data may be indexed in SAB 22.

An embodiment of the write-combining device 10 also includes DAC 30, which includes, for example, a write-combining buffer ("WCB") 32. The DAC 30 receives UC stores, for example, from the MOB 20 and holds the UC stores in WCB 32 until retirement. If it is determined that a UC store satisfies the write-combining parameters (discussed below), MOB 20 may notify DAC 30 when the store is sent to the DAC 30. Based on the notification, DAC 30 may combine the store with one or more additional UC stores in WCB 32 before they are committed. The determination of whether two stores should be write-combined may be made by any suitable element, but in an embodiment MOB 20 performs the conditional checks as the store is sent to DAC 30.

While SAB 22, SDB 24, and WCB 32 may be of any suitable size and arrangement, in one embodiment SAB 22 includes 24 entries, each entry being 36 bits wide, and SDB 24 includes 24 entries, each 128 bits wide. In an exemplary embodiment, WCB 32 includes at least one storage buffer 34, for example six storage buffers 34. Each storage buffer 34 may be of any suitable size, and preferably are each 64 bytes in size. Write-combining device 10 may be connected to a memory 50, such as dynamic random access memory ("DRAM"), by a bus 40.

Figure 2:
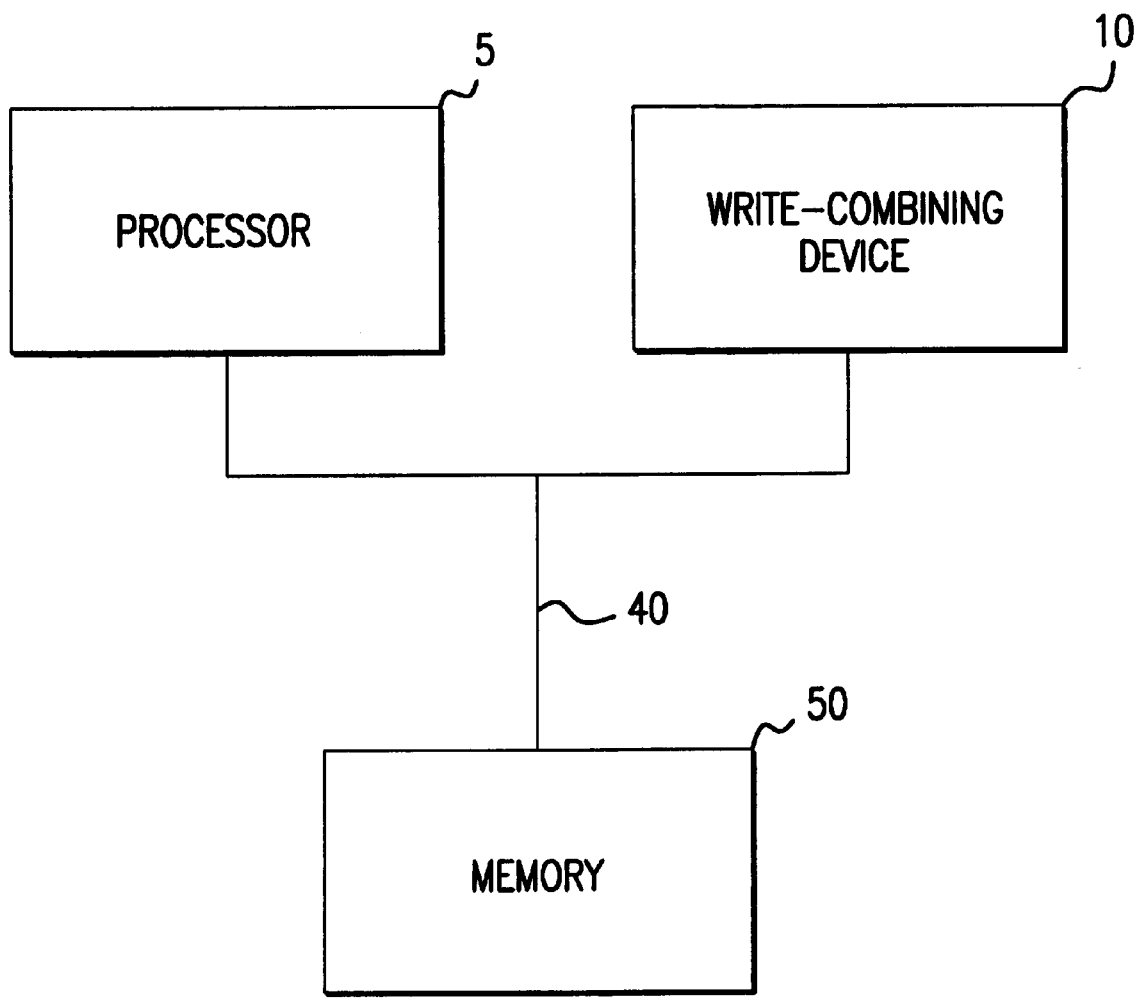
FIG. 2 is a schematic view of an exemplary embodiment of a computer system according to the present invention.

FIG. 2 illustrates an embodiment of computer system according to the present invention. In the illustrated embodiment, the computer system includes a processor 5, a write-combining device 10, and DRAM 50 connected by bus 40. Processor 5 executes stores, which are received by write-combining device 10. Write-combining device 10 combines the stores under certain conditions, for example the conditions outlined below, and commits the stores to DRAM 50. While in FIG. 2 write-combining device 10 is illustrated as a separate element from processor 5, write-combining device 10 and processor 5 may be configured as desired.

Figure 3A:
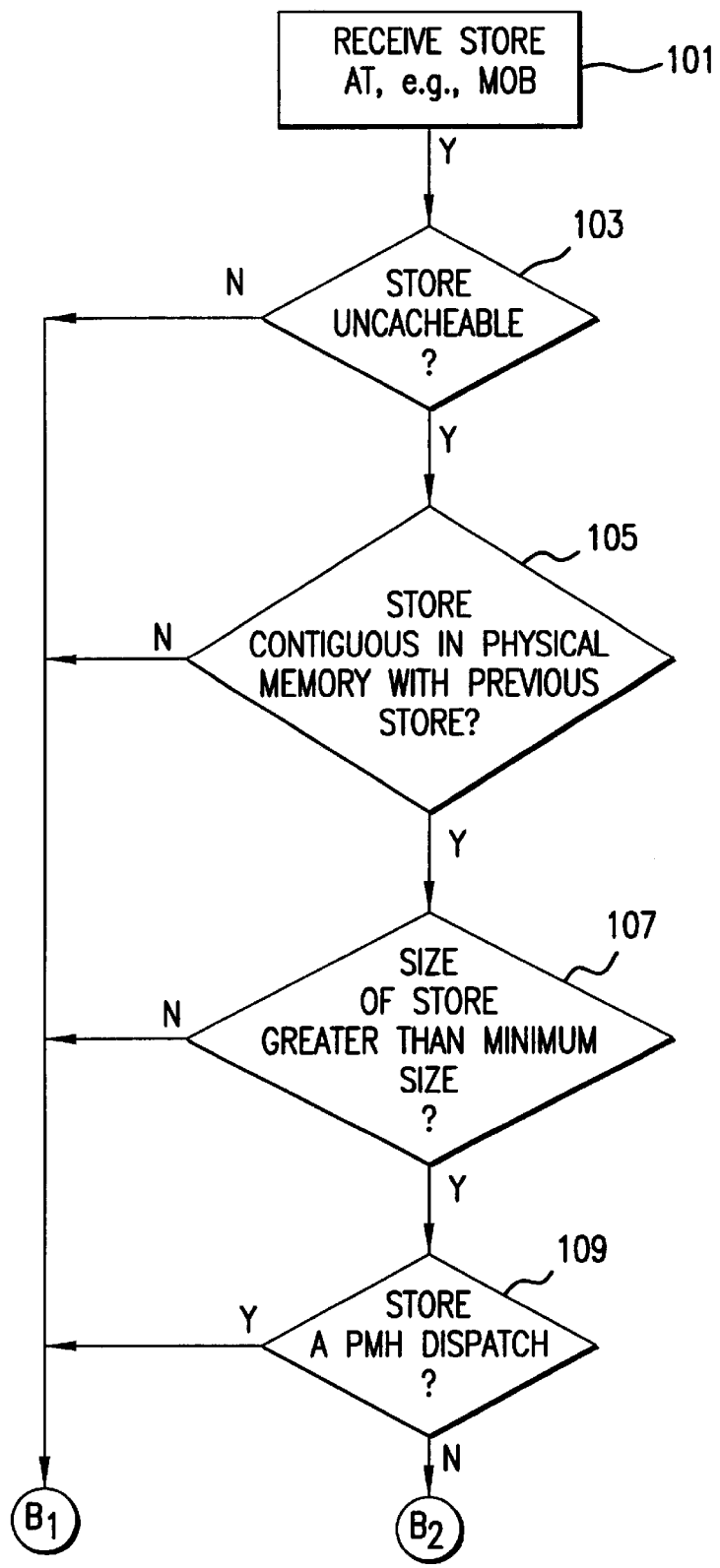
FIGS. 3A and 3B are a flowchart of an exemplary embodiment of a method of packing and unpacking uncacheable stores according to the present invention.
Figure 3B:
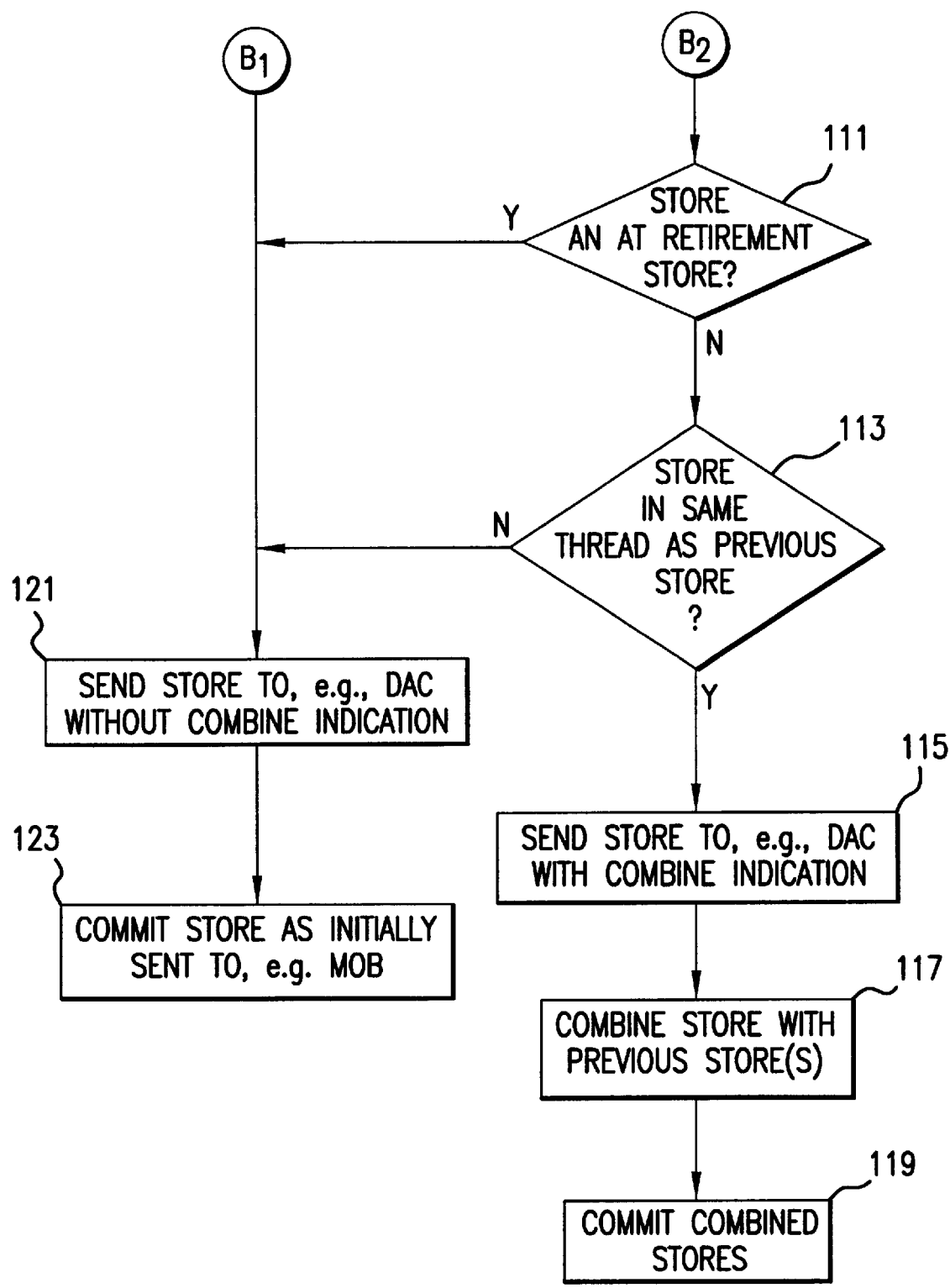

A write-combining device 10 according to the present invention may impose a variety of conditions to determine whether two stores should be write-combined. In one embodiment, MOB 20 makes the following checks or determinations, which may be performed according to the method outlined in FIGS. 3A and 3B:

(1) Whether the current store is uncacheable (meaning simply that the store will be committed to system memory such as DRAM 50);

(2) The size and address of the present store;

(3) The address of the next store;

(4) Whether the store is a page mishandler ("PMH") dispatch;

(5) Whether the store is an at-retirement store; and (6) The current thread.

In one embodiment, these checks are performed when the store is dispatched from MOB 20 to DAC 30, but could also be performed by DAC 30 itself or other elements. Each of the conditions is discussed in detail below, with reference to FIGS. 3A and 3B.

Upon receiving a store (101), MOB 20 may determine whether the store being dispatched (the "present store") is in fact a UC store (103). If the present store is not a UC store, it may be placed within a data cache or other suitable memory as desired. Assuming the present store is a UC store, then it is eligible for write-combining, and it may be combined as described herein if the remaining conditions are satisfied.

An exemplary write-combining device 10 may only combine UC stores that are stored sequentially in memory (i.e., which are contiguous in memory) (105). In other words, for two stores to be write-combinable, the physical address of one must be equal to the physical address of the other plus the size of the other. In one method of making this determination, when a present store is dispatched from MOB 20 to DAC 30, the write-combining device 10 generates or retains the physical address of the present store plus the size of the present store. This information allows write-combining device 10 to determine an address of a next write-combinable store. If the next UC store dispatched from MOB 20 to DAC 30 has a physical address which matches the required address, then the two stores are eligible for write-combining. The requirement of contiguous memory locations again simplifies the unpacking process, as the combined stores need only be unpacked in blocks and placed in sequential physical locations, without addressing each individual block.

In one embodiment, only sequentially-executed UC stores are eligible for combination. In other words, each store is only compared with the previously-executed store to determine if the stores' addresses are sequential. (In a multi-thread mode, stores may be combined, for example, if executed sequentially within the same thread.) For example, the physical address of a present store will be compared to the physical address and size of the previous store, but not to any stores dispatched before the previous store. Likewise, the exemplary write-combining device 10 may determine whether the present store and the following store are contiguous in memory, but will not compare the present store with later-dispatched stores. Thus according to the exemplary embodiment stores are not compared to, and may not be combined with, nonsequentially-executed stores of the same thread.

Write-combining device 10 may require a minimum size for a store to be write-combinable (107). In one embodiment, only UC stores which are, for example, four bytes in size or a multiple of four bytes in size are write-combinable. This factor may, of course, be increased or reduced, and write-combining device 10 may also combine smaller stores or mixed store sizes if desired, for example one-byte or six-byte stores. Limiting the sizes of combinable stores, however, simplifies unpacking at the back end. When the combined stores always include a number of bytes equal to a multiple of four, they can be unpacked in simple four-byte units, without fear of erroneously including extra bits or cutting off remaining bits.

MOB 20 may also determine whether the present store is a PMH dispatch (109) or an at-retirement store (111). PMH dispatches relate, for example, to commands that might span predefined architectural boundaries, while at-retirement stores relate, for example, to multiprocessor operations. In one embodiment of a system according to the present invention, PMH dispatches and at-retirement stores are not eligible for write-combining.

Write-combining device 10 may also be utilized in a multi-thread mode, in which processor 5 carries on two series, or "threads," of instructions simultaneously by dividing processor time between the two threads. In this case, consecutive stores executed by processor 5 may be from different threads or from the same thread (113). In an exemplary embodiment of the present invention, write-combining is not supported between stores from different threads. Rather, a present store may only be write-combined with the last-executed store within the same thread, regardless of whether stores from other threads are executed between the two.

Accordingly, in one embodiment of write-combining device 10, a present UC store may only be combined with a previously-executed UC store (an "earlier store") if, for example: (1) the physical address of the present store is equal to the physical address of the earlier store plus the size of the earlier store (i.e. the two are contiguous in physical memory); (2) the present store is executed sequentially with the earlier store (within the same thread); (3) both stores are four bytes in size or a multiple of four bytes in size; (4) neither store is a PMH dispatch or an at-retirement store; and (5) the stores are from the same thread. These conditions greatly simplify the apparatus and process for unpacking the stores. Of course, these conditions may be checked or determined in any order, and the order described herein should not be construed as a limitation on the present invention. Moreover, in other embodiments of write-combining devices according to the present invention certain of the conditions may be omitted or modified, or different conditions may be employed, if greater flexibility or simplicity is desired.

If the store satisfies the above conditions, it may be sent to, for example, the DAC 30 with an indication to combine (115), and then combined with one or more previous stores (117). The combination of stores may then be committed when suitable (119). If on the other hand the store fails to satisfy one or more conditions, then it may be sent to the DAC 30 without a combine indication (121). It may then be committed in the same form in which it was executed (123).

As noted above, DAC 30 may receive the stores from MOB 20 along with an instruction or indication as to whether the stores should be write-combined. DAC 30 may then allocates each store to an active storage buffer 34 in WCB 32. WCB 32 may contain a plurality of storage buffers 34 for this purpose, and in an exemplary embodiment contains four buffers 34. If DAC 30 receives a store which is write-combinable with the previous store, it may combine the store with previous stores in the currently active buffer 34. Again, in one embodiment this will only occur if the above conditions are met. If on the other hand the store may not be combined, then DAC 30 may place the UC store in a different one of buffers 34.

Once an active storage buffer 34 becomes full, that buffer 34 may be flushed, and later stores may be allocated to a new active buffer 34. Other conditions may also result in a storage buffer 34 being flushed. In one embodiment, for example, a storage buffer 34 may be flushed in the case of a UC load (for example when global identification of stores is required), when a new buffer 34 becomes active, or when the SAB 22 is empty. In the latter situation, an empty SAB 22 indicates the absence of any UC stores in the pipeline, offering an opportunity to flush storage buffer 34 during an otherwise inactive period.

After the stores are committed, they may be unpacked by a relatively simple mechanism, as described above. The unpacking mechanism may unpack the combined stores in, for example, four-byte units. The units may then be placed in system memory such as DRAM 50. This placement is uncomplicated because even if two or more stores have been combined, the stores have sequential memory addresses. Accordingly, the unpacking system may simply check the address of the first four-byte unit and place any additional units in sequential memory locations.

The write-combining device and method according to the present invention have been described with respect to an exemplary embodiment. It can be understood, however, that there are many other variations of the above-described embodiment which will be apparent to those skilled in the art, even where elements have not explicitly been designated as exemplary. It is understood that these and other modifications are within the teaching of the present invention, which is to be limited only by the claims appended hereto.

What is claimed is:

1. A write-combining device for write-combining uncacheable stores, comprising:

a memory order buffer to receive first and second stores; and a data cache address and control coupled to the memory order buffer and having at least one storage buffer, the data address and control to receive the first and second stores from the memory order buffer, the first and second stores being write-combined if the first and second stores are sequentially-executed from a same thread.

2. The write-combining device according to claim 1, the first and second stores being write-combined if each of the first and second stores is at least a minimum size.

3. The write-combining device according to claim 2, wherein the minimum size is four bytes.

4. The write-combining device according to claim 1, the first and second stores being write-combined if each of the first and second stores is not a page mishandler dispatch.

5. The write-combining device according to claim 4, the first and second stores being write-combined if each of the first and second stores is not an at-retirement store.

6. The write-combining device according to claim 4, the memory order buffer including a store address buffer and a store data buffer, the store address buffer to receive information addressing contents of the store data buffer and the store date buffer to receive the first and second stores;

the data cache address and control including a write-combining buffer, the write-combining buffer including the at least one storage buffer.

7. The write-combining device according to claim 6, the at least one storage buffer including a plurality of storage buffers, the plurality of storage buffers including an active storage buffer, the active storage buffer to receive stores and the active storage buffer being flushed upon the occurrence of any of a plurality of flushing conditions, the flushing conditions including the active buffer being full, the first and second stores not being write combined, and the store address buffer being empty.

8. The system according to claim 7, each of the plurality of storage buffers being at least 64 bytes in size.

9. The write-combining device according to claim 1, the first and second stores being write-combined if the first and second stores are each uncacheable.

10. The write-combining device according to claim 1, the first and second stores being write-combined if the first and second stores are contiguous in memory.

11. A computer system, comprising:

a processor;

a memory device coupled to the processor via a bus;

a write-combining device coupled to each of the processor and the memory device via the bus, the write-combining device including:

a memory order buffer to receive first and second stores; and a data cache address and control coupled to the memory order buffer and having at least one storage buffer, the data address and control to receive the first and second stores from the memory order buffer, the first and second stores being write-combined if the first and second stores are sequentially-executed from a same thread.

12. The computer system according to claim 1, the first and second stores being write-combined if each of the first and second stores is at least a minimum size.

13. The computer system according to claim 12, wherein the minimum size is four bytes.

14. The computer system according to claim 11, the first and second stores being write-combined if each of the first and second stores is not a page mishandler dispatch.

15. The computer system according to claim 14, the first and second stores being write-combined if each of the first and second stores is not an at-retirement store.

16. The computer system according to claim 11, the first and second stores being write-combined if the first and second stores are each uncacheable.

17. The computer system according to claim 11, the first and second stores being write-combined if the first and second stores are contiguous in memory.

18. A method for write-combining uncacheable stores, the method comprising:

receiving first and second stores at a memory order buffer;

determining whether the first and second scores are sequentially-executed within a same thread; and write-combining the first and second stores in a storage buffer if the first and second stores are determined to be sequentially-executed within the same thread.

19. The method according to claim 18, further comprising:
- determining whether the first and second stores are uncacheable; and
- write-combining the first and second stores in the storage buffer if the first and second stores are determined to be uncacheable.

20. The method according to claim 18, further comprising:
- determining whether the first and second stores are contiguous in memory; and
- write-combining the first and second stores in the storage buffer if the first and second stores are determined to be contiguous in memory.

21. The method according to claim 20, further comprising:
- determining whether the first and second stores are at least a minimum size, the first and second stores being write-combined if each of the first and second stores is at least the minimum size.

22. The method according to claim 21, wherein the minimum size is four bytes.

23. The method according to claim 21, further comprising:
- determining whether either of the first and second stores is a page mishandler dispatch, the first and second stores being write-combined if neither of the first and second stores is the page mishandler dispatch.

24. The method according to claim 23, further comprising:
- determining whether either of the first and second stores is an at-retirement store, the first and second stores being write-combined if neither of the first and second stores is the at-retirement store.

25. The method according to claim 24, further comprising:
- committing the first and second stores to memory.

* * * * *